United States Patent [19]
Hoefflin

[11] Patent Number: 5,859,119
[45] Date of Patent: Jan. 12, 1999

[54] REINFORCED ALIPHATIC POLYESTER MOLDING COMPOSITION HAVING IMPROVED DUCTILITY/FLOW PROPERTIES

[75] Inventor: Frank A. Hoefflin, Evansville, Ind.

[73] Assignee: General Electric Company, Pittsfield, Mass.

[21] Appl. No.: 929,649

[22] Filed: Sep. 15, 1997

[51] Int. Cl.$^6$ ....................................... C08K 3/00
[52] U.S. Cl. ............................. 524/494; 525/411
[58] Field of Search ................ 524/494; 525/411

[56] References Cited

U.S. PATENT DOCUMENTS

| | | | |
|---|---|---|---|
| 3,657,389 | 4/1972 | Caldwell et al. | 260/873 |
| 4,125,572 | 11/1978 | Scott | 260/860 |
| 4,342,678 | 8/1982 | Buxbaum et al. | 524/539 |
| 4,581,420 | 4/1986 | Smith | 525/437 |
| 4,968,731 | 11/1990 | Lausberg et al. | 523/436 |
| 5,115,016 | 5/1992 | Dickens et al. | 524/513 |
| 5,260,379 | 11/1993 | Blakely et al. | 525/173 |
| 5,399,661 | 3/1995 | Borman | 528/307 |
| 5,410,000 | 4/1995 | Borman | 525/437 |
| 5,486,562 | 1/1996 | Borman et al. | 524/457 |
| 5,498,668 | 3/1996 | Scott | 525/173 |

FOREIGN PATENT DOCUMENTS 0 248 352   12/1987   European Pat. Off. .

*Primary Examiner*—Edward J. Cain

[57] ABSTRACT

Reinforced, molding compositions having improved ductility and melt flow properties. The present compositions contain a cyclo aliphatic polyester resin preferably comprising the reaction product of a cycloaliphatic $C_6$–$C_{12}$ diol or chemical equivalent and $C_6$–$C_{12}$ cycloaliphatic diacid or chemical equivalent, preferably an impact modifying amorphous resin which increases the ductility of the polyester resin but reduces the melt flow properties thereof, a high molecular weight polyetherester polymer which increases the melt flow properties of the polyester polymer without reducing the ductility thereof, and a glass filler to reinforce and stiffen the composition and form a reinforced molding composition.

11 Claims, No Drawings

REINFORCED ALIPHATIC POLYESTER MOLDING COMPOSITION HAVING IMPROVED DUCTILITY/FLOW PROPERTIES

BACKGROUND OF THE INVENTION

1. Field of the Invention

The present invention relates to improvements in UV-stable reinforced molding compositions containing impact-modifying elastomeric polymers and fibrous filler such as glass fibers, in order to increase the flow properties thereof while still having good ductility and stiffness. The present compositions are based upon cyclo aliphatic polyester polymer blends with polyether-polyester copolymers as binder materials for the reinforced molding compositions. The blend may optionally contain aromatic polycarbonate polymers.

Thermoplastic polymers have many desirable properties that make them useful in injection molding applications. Some of these desirable properties include strength, toughness, heat resistance, and resistance to chemicals. It is known to add impact modifiers to polyester resins to improve the ductility or the notched Izod impact strength thereof. However the effect of such impact modifiers on reinforcing polyester resin compositions, such as those containing 30% by weight of reinforcing glass fibers, is a relatively modest improvement in ductility and, unfortunately, an increase in the melt viscosity or reduction in the melt flow, modulus and heat distortion properties of the composition.

One problem with polyesters in injection molding applications is that it is sometimes difficult to fill large molds requiring long flow lengths or very thin parts because of the high melt viscosity of the polymer. A solution to this problem is to raise the temperature of the polymer melt, thus lowering its viscosity. This solution is often not satisfactory for polyester polymers since polyesters tend to degrade, or lose molecular weight, at elevated processing temperatures.

Also, there are well known additives which reduce the melt viscosity of polyesters. However, these additives usually make the resulting molded material less rigid, less heat resistant, and/or function only by breaking down the molecular weight of the polyester resulting in reduced impact.

2. Description of Prior Art

Reference is made to commonly-assigned U.S. Pat. No. 5,486,562, the disclosure of which is hereby incorporated herein, for its disclosure of UV-stable weatherable molding compositions based upon PCCD aliphatic polyester binder materials containing impact-modifying elastomeric polymers and filler such as glass fibers, which compositions have enhanced melt flow properties while retaining good impact strength properties.

However, the biggest disadvantage of such compositions, when used to mold elements such as automotive trim and door handles, is the sacrifice of ductility and stiffness, resulting in brittleness, in order to improve the melt flow properties of the glass filled, reinforced molding composition.

Reference is also made to commonly-assigned U.S. Pat. No. 5,122,551, the disclosure of which is also incorporated herein, for its disclosure of glass-filled copolyether-polyester compositions containing copolyetherester elastomers. Reinforced copolyether-polyester compositions generally have superior tensile strength and flexural strength when combined with glass fibers treated with epoxy cyanurate sizing agents, as disclosed in said Patent, but do not have good weatherability.

Finally, reference is made to U.S. Pat. No. 4,342,678 which discloses glass fiber-reinforced thermoplastic molding compositions based upon mixtures of certain cycloaliphatic polyester polymers and glass fibers.

SUMMARY OF THE INVENTION

The present invention relates to the discovery that the ductility and melt flow properties of the prior known UV-stable impact-modified, reinforced cycloaliphatic polyester blend molding compositions can be substantially enhanced and improved by the addition thereto of a high molecular weight polymeric polyetherester, preferably one containing a polyether segment such as poly (tetrahydrofuran).

DETAILED DESCRIPTION

The present cycloaliphatic polyesters are condensation products of aliphatic diacids, or chemical equivalents, and aliphatic diols, or chemical equivalents. The present cycloaliphatic polyesters may be formed from mixtures of aliphatic diacids and aliphatic diols but must contain at least 80 mole % of cyclic diacid and/or diol components, the remainder, if any, being linear aliphatic diacids and/or diols. The cyclic components are necessary to impart good rigidity, and they do not absorb UV light under normal exposure conditions, thereby providing rigid molded articles having excellent weatherability properties. Aromatic components are not preferred since, to the extent they are present, they impart enhanced UV-absorbance leading to degraded weatherability properties.

The preferred cycloaliphatic polyesters for use in the present molding compositions are condensation products of cycloaliphatic diols and cycloaliphatic diacids or chemical equivalents of the diacids such as the salts, esters or acid halides thereof, preferably the 1,4-cyclohexyl diacids and most preferably greater than 70 mole % thereof in the form of the trans isomer. The preferred cycloaliphatic diols are 1,4-cyclohexyl primary diols such as 1,4-cyclohexyl dimethanol, most preferably more than 70 mole % thereof in the form of the trans isomer.

The diols useful in the preparation of the polyester resins of the present invention are straight chain, branched, or preferably cycloaliphatic alkane diols and may contain from 2 to 12 carbon atoms. Examples of such diols include but are not limited to ethylene glycol; propylene glycol, i.e., 1,2- and 1,3-propylene glycol; butane diol, i.e., 1,3- and 1,4-butane diol; diethylene glycol; 2,2-dimethyl-1,3-propane diol; 2-ethyl, 2-methyl, 1,3-propane diol; 1,3- and 1,5-pentane diol; dipropylene glycol; 2-methyl-1,5-pentane diol; 1,6-hexane diol; dimethanol decalin, dimethanol bicyclo octane; 1,4-cyclohexane dimethanol and particularly its cis- and trans-isomers; triethylene glycol; 1,10-decane diol; and mixtures of any of the foregoing. Preferably a cycloaliphatic diol or chemical equivalent thereof and particularly 1,4-cyclohexane dimethanol or its chemical equivalents are used as the diol component, preferably a mixture of cis- to trans-isomers thereof, where the trans isomer content is 70% or more.

Chemical equivalents to the diols include esters, such as dialkylesters, diaryl esters and the like.

The diacids useful in the preparation of the aliphatic polyester resins of the present invention preferably are cycloaliphatic diacids. This is meant to include carboxylic acids having two carboxyl groups each of which is attached to a saturated carbon. Preferred diacids are cyclo or bicyclo aliphatic acids, for example, decahydro naphthalene dicarboxylic acids, norbornene dicarboxylic acids, bicyclo octane dicarboxylic acids, 1,4-cyclohexanedicarboxylic acid or chemical equivalents, and most preferred is trans-1,4-cyclohexanedicarboxylic acid or chemical equivalent.

Cyclohexanedicarboxylic acids and their chemical equivalents can be prepared, for example, by the hydrogenation of cycloaromatic diacids and corresponding derivatives such as isophthalic acid, terephthalic acid or naphthalenic acid in a suitable solvent, water or acetic acid at room temperature and at atmospheric pressure using suitable catalysts such as rhodium supported on a suitable carrier of carbon or alumina. See, Friefelder et al, *Journal of Organic Chemistry*, 31, 3438 (1966); U.S. Pat. Nos. 2,675,390 and 4,754,064. They may also be prepared by the use of an inert liquid medium in which a phthalic acid is at least partially soluble under reaction conditions and a catalyst of palladium or ruthenium in carbon or silica. See, U.S. Pat. Nos. 2,888,484 and 3,444,237.

Typically, in the hydrogenation, two isomers are obtained in which the carboxylic acid groups are in cis- or trans-positions. The cis- and trans-isomers can be separated by crystallization with or without a solvent, for example, n-heptane, or by distillation. The cis-isomer tends to blend better; however, the trans-isomer has higher melting and crystallization temperatures and is especially preferred. Mixtures of the cis- and trans-isomers are useful herein as well, and preferably when such a mixture is used, the trans-isomer will comprise at least about 70 parts by weight.

When the mixture of isomers or more than one diacid is used, a copolyester or a mixture of two polyesters may be used as the present cycloaliphatic polyester resin.

Chemical equivalents of these diacids include esters, alkyl esters, e.g., dialkyl esters, diaryl esters, anhydrides, salts, acid chlorides, acid bromides, and the like. The preferred chemical equivalents comprise the dialkyl esters of the cycloaliphatic diacids, and the most preferred chemical equivalent comprises the dimethyl ester of the acid, particularly dimethyl-trans-1,4-cyclohexane-dicarboxylate.

The polyester resins of the present invention are typically obtained through the condensation or ester interchange polymerization of the diol or diol equivalent component with the diacid or diacid chemical equivalent component and have recurring units of the formula

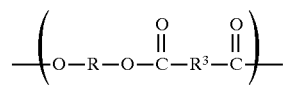

wherein R represents an alkyl or cycloalkyl radical containing 2 to 12 carbon atoms and which is the residue of a straight chain, branched, or cyloaliphatic alkane diol having 2 to 12 carbon atoms or chemical equivalents thereof; and $R^3$ is an alkyl or a cycloaliphatic radical which is the decarboxylated residue derived from a cycloaliphatic diacid or chemical equivalent thereof with the proviso that at least one R or $R^3$ group is a cycloalkyl group.

A preferred cycloaliphatic polyester is poly(1,4-cyclohexane—dimethanol-1,4-dicarboxylate) (PCCD) having recurring units of the formula

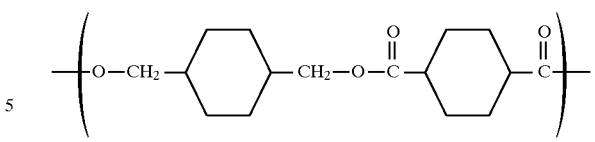

wherein R from above is derived from 1,4 cyclohexane dimethanol; and wherein $R^3$ from above is a cyclohexane ring derived from cyclohexanedicarboxylate or a chemical equivalent thereof.

The reaction is generally run in the presence of a suitable catalyst such as a tetrakis (2-ethyl hexyl) titanate, in a suitable amount, typically about 100 to 400 ppm of titanium based upon the final product.

The preferred aliphatic polyesters used in the present reinforced molding compositions have a glass transition temperature ($T_g$) which is above 50° C.

In addition to the cycloaliphatic polyester binder material, the present compositions can contain up to 50% by weight of additional polymeric binder materials, such as polycarbonate (PC) polymers, especially aromatic polyesters such as bisphenol A (BPA-PC), polyalkylene phthalates or naphthanoates, polybutylene terephthalate polymers (PBT) polyethylene terephthalate polymers (PET), polypropylene terephthalate polymers (PPT), polyethylene naphthanoate polymers (PEN), polycyclohexane dimethanol terephthalates (PCT) and styrene-acrylonitrile copolymers, preferably containing 25%–35% of acrylonitrile.

The substantially amorphous impact modifier copolymer resin added to the present composition in an amount between about 5 and 25% by weight may comprise one of several different rubbery modifiers such as graft or core shell rubbers or combinations of two or more of these modifiers. Suitable are the groups of modifiers known as acrylic rubbers, ASA rubbers, diene rubbers, organosiloxane rubbers, EPDM rubbers, SBS or SEBS rubbers, ABS rubbers and glycidyl ester impact modifiers.

The term acrylic rubber modifier can refer to multi-stage, core-shell, interpolymer modifiers having a cross-linked or partially crosslinked (meth)acrylate rubbery core phase, preferably butyl acrylate. Associated with this cross-linked acrylic ester core is an outer shell of an acrylic or styrenic resin, preferably methyl methacrylate or styrene, which interpenetrates the rubbery core phase. Incorporation of small amounts of other monomers such as acrylonitrile or (meth)acrylonitrile within the resin shell also provides suitable impact modifiers. The interpenetrating network is provided when the monomers forming the resin phase are polymerized and cross-linked in the presence of the previously polymerized and cross-linked (meth)acrylate rubbery phase.

Preferred rubbers are graft or core shell structures with a rubbery component with a Tg below 0° C., preferably between about −40° to −80° C., composed of poly alkylacrylates or polyolefins grafted with PMMA or SAN. Preferably the rubber content is at least 40 wt %, most preferably between about 70–90 wt %.

Preferred glycidyl ester impact modifiers are polymers that comprise repeating units derived from one or more glycidyl ester monomers. As used herein, the terminology "glycidyl ester monomer" means a glycidyl ester of an ethylenically unsaturated carboxylic acid such as, e.g., acrylic acid, methacrylic acid, itaconic acid, and includes, e.g., glycidyl acrylate, glycidyl methacrylate, and glycidyl itaconate. In a preferred embodiment, the glycidal ester monomer is glycidyl acrylate or glycidyl methacrylate copolymerized with an olefin. A preferred content of the glycidyl ester modifier is between 1% to 10%.

The preferred impact modifiers for use according to the present invention generally comprise a glycidyl ester polymer, or an acrylic or methacrylic grafted polymer of an acrylate elastomer, alone or co-polymerized with a vinyl aromatic compound. Especially suitable grafted polymers are the acrylic core-shell polymers of the type available from Rohm & Haas, for example Acryloid® EXL3330. Most preferably, the impact modifier will comprise a two stage polymer having an n-butyl acrylate based rubbery core and a second stage polymerized from methylmethacrylate alone or in combination with styrene. Also present in the first stage are cross linking monomers and graft linking monomers.

Suitable glycidyl ester olefin copolymers may, optionally, contain a minor amount, i.e., up to about 50 wt %, of repeating units derived from one or more other monoethylenically unsaturated monomers that are copolymerizable with the glycidyl ester monomer. As used herein the terminology "monoethylenically unsaturated" means having a single site of ethylenic unsaturation per molecule. Suitable copolymerizable monoethylenically unsaturated monomers include, e.g., vinyl aromatic monomers such as, e.g., styrene and vinyl toluene, vinyl esters such as e.g., vinyl acetate and vinyl propionate, and ($C_1$–$C_{20}$) alkyl(meth) acrylates such as, eg., butyl acrylate, methyl methacrylate, cyclohexyl methacrylate. As used herein, the term "($C_1$–$C_{20}$)alkyl" means a straight or branched alkyl group of from 1 to 20 carbon atoms per group, such as e.g., methyl, ethyl, decyl, eicosyl, cyclohexyl and the term "(meth)acrylate" refers collectively to acrylate compounds and methacrylate compounds.

Suitable glycidyl ester copolymers can be made by, e.g., conventional free radical initiated copolymerization or graft polymerization methods.

In a highly preferred embodiment, the glycidyl ester impact modifier is a random copolymer having a relative composition according to structural formula (1):

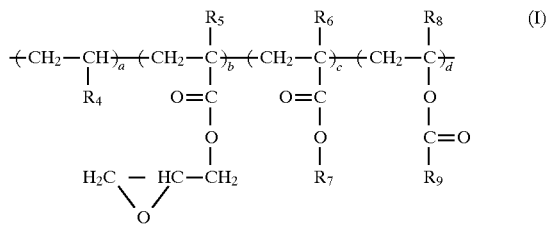

wherein: $R_4$ is H, alkyl or aryl, preferably H;

$R_5$, $R_6$ and $R_8$ are each independently H or ($C_1$–$C_6$)alkyl, preferably H or methyl;

$R_7$ and $R_9$ are each independently alkyl or aryl, preferably methyl;

a+b+c+d=100;

a is from 50 to 99.5;

b is from 0.5 to 25, preferably 1 to 10;

c is from 0 to 50; and d is from 0 to 50, preferably 0.

In a preferred embodiment, the melt index, as measured at 190° C. according to ASTM D-1238, of the glycidyl ester impact modifier is from 0.1 to 100 grams/10 minutes and preferably from 0.5 to 30 grams/10 minutes and preferably from 0.5 to 30 grams/10 minutes.

Preferred rubbery modifiers are those with good weathering, that is, based on acrylic, silicone or olefin rubber rather than diene based rubbers.

In a preferred embodiment, the glycidyl ester impact modifier comprises one or more copolymers selected from olefin-glycidyl (meth)acrylate copolymers, olefin-vinyl acetate-glycidyl (meth)acrylate copolymers and olefin-glycidyl(meth)acrylate-alkyl(meth)acrylate copolymers.

The preferred impact-modified, cycloaliphatic polymer compositions of the present invention comprise:

(A) from 20 to 80% by weight of a cyclo aliphatic polyester resin, preferably one comprising the reaction product of:

(a) at least one straight chain, branched, or cycloaliphatic $C_2$–$C_{12}$ alkane diol, most preferably a $C_6$–$C_{12}$ cycloaliphatic diol, or chemical equivalent thereof; and (b) at least one cycloaliphatic diacid, most preferably a $C_6$–$C_{12}$ diacid, or chemical equivalent thereof; and (B) from 0 to about 25% preferably from 5 to 25% by weight of an impact modifier comprising a substantially amorphous resin comprising one of several different modifiers or combinations of two or more of these modifiers. Suitable are the groups of modifiers known as ASA modifiers, EPDM graft SAN modifiers, acrylic rubber modifiers, and glycidyl ester modifiers;

(C) from 2 to about 50%, preferably from 5 to 35% by weight of a high molecular weight polyetherester polymer which increases the melt flow properties of the impact-modified polyester polymer (a & b) without reducing the ductility thereof, and (D) from 5 to about 50%, preferably from 10 to 40% by weight of a glass fiber filler to reinforce and stiffen the composition and form a reinforced molding composition.

While cyclo aliphatic polyester resins are preferred binder-materials, since they have very high UV-stability properties, the present invention includes the use of blends of cyclo aliphatic polyester resins, which are expensive, in admixture with less expensive, conventional UV-stable polycarbonate (PC) resins, in order to reduce the overall cost of the composition without substantially reducing the UV-stability properties thereof.

The preferred impact modifiers generally comprise an acrylic or methacrylic grafted polymer of an acrylate elastomer, alone or co-polymerized with a vinyl aromatic compound. Especially preferred grafted polymers are the acrylic core-shell polymers of the type available from Rohm & Haas, for example Acryloid® EXL3330. Most preferably, the impact modifier will comprise a two stage polymer having n-butyl acrylate based rubbery core and a second stage polymerized from methylmethacrylate alone or in combination with styrene. Also present in the first stage are cross linking monomers and graft linking monomers. Examples of the cross linking monomers include 1,3-butylene diacrylate, divinyl benzene and butylene dimethacrylate. Examples of graft linking monomers are allyl acrylate, allyl methacrylate and diallyl maleate.

Additional impact modifiers are of the type disclosed in U.S. Pat. No. 4,292,233, incorporated by reference. These impact modifiers comprise, generally, a relatively high content of a cross-linked butadiene polymer grafted base having grafted thereon acrylonitrile and styrene.

The method of blending the compositions can be carried out by conventional techniques. One convenient method comprises blending the polyester, polyetherester and other ingredients in powder or granular form, extruding the blend and comminuting into pellets or other suitable shapes. The ingredients are combined in any usual manner, e.g., by dry mixing or by mixing in the melted state in an extruder, or in other mixers.

The critical additive of the present invention is the high molecular weight polymeric polyetherester which, when incorporated in an amount between about 2 and 35% by weight, not only substantially improves or increases the melt flow properties of the filled or reinforced composition but also unexpectedly increases the ductility of the composition. Moreover, increased loading of certain polyetheresters into the composition substantially increases the heat deflection temperature (HDT) at 264 psi, which also is completely unexpected.

The preferred polyetherester modifiers are those containing high molecular weight polycaprolactone or polytetrahydrofuran polymers, such as poly(butylene terephthalate)-poly(tetrahydrofuran) block copolymers commercially available from DuPont under the trademark "Hytrel", and poly(cyclohexamethylene) cyclohexylene dicarboxylate-polytetrahydrofuran block copolymers commercially-available from Eastman under the trademark "Ecdel", and "Lomod" polyetherimide polyester resins commercially-available from General Electric Company.

While the aforementioned polyetherester polymers are preferred it should be understood that suitable thermoplastic copolyetheresters for use in this invention include both random and block copolymers. In general, these are prepared by conventional esterification/polycondensation processes from one or more diols, one or more dicarboxylic acids, one or more long chain ether glycols, and one or more caprolactones or polycaprolactones, as disclosed in aforementioned U.S. Pat. No. 5,122,551.

Polycycloaliphatic polyester-polyethers are preferred, most preferably $C_6$–$C_{12}$ polycyclohexyldiol-$C_6$–$C_{12}$-polycyclohexyldiacidpolyester-poly tetrahydrofurans, such as Ecdel 9960.

The present weatherable molding compositions are reinforced or stiffened by the inclusion of a fibrous glass or carbon filler, preferably glass fibers, in amounts ranging between about 5% and 50% by weight of the total composition, most preferably between 10% and 40%.

The glass fiber or filamentous glass employed as reinforcement in the present compositions, preferably comprise lime-aluminum borosilicate glass that is relatively soda-free. The filaments are made by standard processes, e.g., by steam or air blowing, flame blowing and mechanical pulling. The preferred filaments for plastic reinforcement are made by mechanical pulling. The filament diameters range from about 3 to 30 microns but this is not critical to the present invention.

Additionally, additives such as antioxidants, nucleating agents, minerals such as talc, clay, mica, barite, wollastonite and other stabilizers including but not limited to UV stabilizers, such as benzotriazole, supplemental reinforcing fillers such as flaked or milled glass, and the like, flame retardants, pigments or combinations thereof may be added to the compositions of the present invention.

DESCRIPTION OF THE PREFERRED EMBODIMENTS

The following examples illustrate the invention without limitation. All parts are given by weight unless otherwise indicated.

As set forth in the following examples, the properties are measured according to the following procedures.

Notched Izod (NI) and Unnotched Izod (UNI): This test procedure is based on the ASTM D256 method. In this case, using Izod Method E, the unnotched impact strength is obtained by testing an unnotched specimen. The results of the test is reported in terms of energy absorbed per unit of specimen width, and expressed in foot times pounds per inch (Ft.Lbs./In.). Typically the final test result is calculated as the average of test results of five test bars.

Biaxial impact test (Dynatup®): This test procedure is based on the ASTM D3763 method and was performed on a Dynatup impact test machine. This procedure provides information on how a material behaves under multiaxial deformation conditions. The deformation applied is a high speed puncture. An example of a supplier of this type of testing equipment is Dynatup. Reported as test results are the so-called total energy and maximum load values at various temperatures, which are expressed in foot times pounds (Ft.Lbs.). The final test result is calculated as the average of the test results of typically ten test plaques.

Melt viscosity (MV): This test procedure is based on the ASTM D1238 method. The equipment used is an extrusion plastometer equipped with an automatic timer. A typical example of this equipment would be the Tinius Olson MP 987. Before testing, the samples are dried for one hour at 150° C. The testing conditions are a melt temperature of 250° C., a total load of 5,000 gram, an orifice diameter of 0.0825 inch, and a dwell time of 5 minutes. The test result is expressed in the unit Poise.

Flexural Modulus: This test procedure is based on the ASTM D790 method. Typical test bars have the following dimensions: ⅛ inch times ½ inch times 2½ inch. The final test result is calculated as the average of test results of five test bars. The test involves a three point loading system utilizing center loading on a simply supported beam. Instron and Zwick are typical examples of manufacturers of instruments designed to perform this type of test. The flexural modulus is the ratio, within the elastic limit, of stress corresponding strain and is expressed in pounds per square inch (psi).

Tensile Strength: This test procedure is based on the ASTM D638 method. Test bars in the form of the standard dumbbell shape are used in this test method. The final test result is calculated as the average of the test results of five test bars. The tensile strength is calculated by dividing the maximum load observed in the test by the original minimum cross-sectional area of the test specimen. The result is expressed in pounds per square inch (psi). Instron and Zwick are typical examples of manufacturers of instruments designed to perform this type of test.

HDT Test: Heat distortion temperature measured as per ASTM D 648.

In the examples the following ingredients are as follows:
1) PCCD 3400 is a cycloaliphatic ester made by reacting equimolar amounts of dimethyl trans-1,4-cyclohexanedicarboxylate (t-DMCD) with 1,4-cyclohexanedimethanol (CHDM) in the presence of a catalyst (e.g. TPT). The polymer has a melt viscosity of 4500–5000 poise (@250° C.) resin with a $T_m$=220° C.
2) Irganox 1076—Hindered Phenolic Antioxidant from Ciba-Geigy
3) Tinuvin 234—UV absorber, substituted hydroxyphenyl benzotriazole from Ciba-Geigy Corporation
4) PC—polycarbonate—Lexan 141, GE Plastics.
5) EXL 3330—acrylic core shell impact modifier from Rohm & Haas Company under the trademark Acryloid.
6) Hytrel 4056—a polyetherester from DuPont.
7) Ecdel 9960—a polyetherester from Eastman.

TABLE 1

| INGREDIENTS | C1 | C2 | E1 | E2 | E3 | E4 | C3 |
|---|---|---|---|---|---|---|---|
| PCCD 3400 | 63.9 | 58.9 | 56.4 | 50.5 | 42.1 | 25.3 | 0.0 |
| Irganox 1076 | 0.2 | 0.2 | 0.2 | 0.2 | 0.2 | 0.2 | 0.2 |
| Phosphite Stab. | 0.2 | 0.2 | 0.2 | 0.2 | 0.2 | 0.2 | 0.2 |
| Tinuvin 234 | 0.3 | 0.3 | 0.3 | 0.3 | 0.3 | 0.3 | 0.2 |
| Carbon Black | 0.3 | 0.3 | 0.3 | 0.3 | 0.3 | 0.3 | 0.3 |
| Phosphorus Acid | 0.1 | 0.1 | 0.1 | 0.1 | 0.1 | 0.1 | 0.3 |
| Glass Fiber | 35.0 | 35.0 | 35.0 | 35.0 | 35.0 | 35.0 | 0.1 |
| EXL 3330 | — | 5.0 | 5.0 | 5.0 | 5.0 | 5.0 | 5.0 |
| Hytrel 4056 | — | — | 2.5 | — | — | — | 2.5 |
| Ecdel 9960 | — | — | — | 8.4 | 16.8 | 33.6 | 56.4 |
|  | 100.0 | 100.0 | 100.0 | 100.0 | 100.0 | 100.0 | 100.0 |

TESTING

| Test | C1 | C2 | E1 | E2 | E3 | E4 | C3 |
|---|---|---|---|---|---|---|---|
| MV @ 250 C., 4900 g, [Poise] | 20123 | 24285 | 21460 | 21638 | 16754 | 15075 | 10036 |
| Unnotched Izod [ft-lb/in] | 12.3 | 11.6 | 13.3 | 12.4 | 14.8 | 16.5 | 20.9 |
| Dynatup @ 22 C. max load [ft-lb] | 7.37 | 4.33 | 3.61 | 3.59 | 4.89 | 4.13 | 5.77 |
| Dynatup @ 22 C. total energy [ft-lb] | 13 | 14.3 | 14.9 | 15 | 15.7 | 14.3 | 12.3 |
| Dynatup @ −10 C. max load [ft-lb] | — | — | 7.8 | 7.3 | 7. | 8.4 | 5.4 |
| Dynatup @ −10 C. total energy [ft-lb] | * | * | 15.6 | 17 | 11.6 | 11.4 | 13.9 |
| Dynatup @ −20 C. max load [ft-lb] | — | — | — | — | — | — | 4.5 |
| Dynatup @ −10 C. total energy [ft-lb] | * | * | * | * | * | * | 14 |
| Tensile Elongation [%] Type I | 6 | 3 | 3 | 3 | 4 | 7 | 9 |
| Tensile Strength [psi] Type I | 8722 | 9530 | 9796 | 9774 | 8716 | 8081 | 5624 |
| Flex. Modus [Kpsi]; Robot | 621 | 590 | 588 | 596 | 430 | 344 | 189 |
| Flex. Strength [Kpsi]; | 14.7 | 13.5 | 13.4 | 13.5 | 10.4 | 10.0 | 6.4 |
| Spec. Gravity [g/cm3] | 1.408 | 1.426 | 1.442 | 1.430 | 1.412 | 1.444 | 1.401 |
| % ASH | 27.4 | 38.3 | 36.6 | 36.4 | 33.9 | 38 | 34.5 |
| HDT 264 psi °C. | 64 | 63 | 55.9 | 53.6 | 60 | 89.7 | 99.7 |

*Less than 5 ft. lb.

In Table 1, Examples E1–E4 are illustrative of the present invention. Comparative Example C1 illustrates the base composition and its properties, in the absence of the Acryloid EXL 3330 acrylic core-shell impact modifier (IM), and in the absence of Hytrel 4056 and Ecdel 9960, both of which are polyetheresters, which function as flow improvers according to the present invention. Comparative Example C2 contains the EXL 3330 impact modifier but not the flow modifier (Hytrel or Ecdel). Comparative Example C3 illustrates the properties of the composition containing EXL 3330 and Hytrel but in the absence of the poly(cyclohexamethylene) cyclohexylene dicarboxylate (PCCD) polymer.

The addition of 5% EXL 3330 (acrylic core/shell IM) increases the ductility of 35% GF-filled PCCD formulations (Example C1>C2). In this case, the ductility is measured as an increase in notched Izod values. A decrease in melt flow is generally observed by incorporating core/shell impact modifiers to enhance the ductility. This effect can also be seen by comparing the MV numbers for Example C1 vs. C2.

However, the additional use of high molecular weight polyetheresters (PEP) such as Hytrel (PBT-PTHF) or Ecdel (PCCD-PTHF) as flow improvers for these formulations in combination with the EXL 3330 produces both enhanced ductility and increased flow properties. The efficiency of 2.5% PEP, for example, can be seen by comparing Example C2 (5% acrylic IM—no PEP) with Example E1 (5% acrylic IM, 2.5% PEP). The ductility of the formulations with PEP is not reduced but is higher since the Example E1 formulation displays an additional −10° C. ductility with a flow improvement of 20%. A similar flow and low temperature ductility improvement can also be found by adding different amounts of Ecdel polyetheresters (Examples E2 to E4 compared with C2). Cycloaliphatic polyetheresters appear to have another beneficial effect: increasing the PEP loading in a GF/PCCD/PEP blend appears to increase the HDT values. This behavior is completely surprising.

The Examples of Table 2 illustrate base compositions containing mixtures of PCCD polymer and polycarbonate polymer, and available under the trademark Lexan 141 from General Electric Co. The control composition of Example C4 contains no impact modifier (IM) or flow modifier, and the control compositions of Examples C5 and C6 contain a polyetherester flow modifier (EXL 3330) but no impact modifier (Hytrel 4056).

TABLE 2

| IN-GREDIENTS | EXAMPLES (% by weight) | | | |
| --- | --- | --- | --- | --- |
| | C4 | C5 | E5 | C6 |
| Lexan 141 | 48.2 | 44.7 | 43.0 | 43.0 |
| PCCD 3400 | 20.7 | 19.2 | 18.4 | 18.4 |
| Irganox 1076 | 0.2 | 0.2 | 0.2 | 0.2 |
| Phosphite Stab. | 0.2 | 0.2 | 0.2 | 0.2 |
| Tinuvin 234 | 0.3 | 0.3 | 0.3 | 0.3 |
| Carbon Black | 0.3 | 0.3 | 0.3 | 0.3 |
| Phosphorous Acid | 0.1 | 0.1 | 0.1 | 0.1 |
| Glass Fiber | 30.0 | 30.0 | 30.0 | 30.0 |
| EXL3330 | — | 5.0 | 5.0 | 5.0 |
| Hytrel 4056 | — | — | 2.5 | — |
| Epoxidized soy bean oil | — | — | — | 2.5 |
| | 100.0 | 100.0 | 100.0 | 100.0 |
| TESTING | | | | |
| Test | C4 | C5 | E5 | C6 |
| MV @ 250 C., 4900 g [Poise] | 23281 | 28879 | 26235 | 16484 |
| Notched Izod [ft-lb/in] | 1.8 | 2.7 | 2.7 | 1.6 |
| Dynatup @ 22 C. max load [ft-lb/in] | 8.7 | 7.6 | 9.9 | 6.6 |
| Dynatup @ 22 C. total energy [ft-lb] | 10.1 | 14.3 | 14.8 | 12.1 |
| Tensile Elongation [%]Type I | 2.8 | 3.1 | 2.9 | 2.1 |
| Tensile Strength [psi] Type I | 12840 | 12210 | 12890 | 10500 |
| Flex Strength [psi] | 18350 | 17800 | 18240 | 13850 |
| Flex Modulus [psi] | 751400 | 702200 | 762000 | 659400 |
| Spec. Gravity [g/cm3] | 1.4066 | 1.3969 | 1.4079 | 1.3884 |
| Ash [%] | 29.7 | 29.1 | 30.6 | 29.9 |
| HDT 264 psi °C. | 112. | 108 | 100.3 | 98.1 |

The effect of the addition of the EXL 3330 acrylic core-shell impact modifier on the GF-reinforced compositions based upon PC/PCCD polymer blends is clear from the comparison between the test results relating to the compositions of Examples C4 and C5, showing roughly a 50% increase in the ductility of the composition of Example C5 over that of Example C4 (measured as notched Izod and Dynatup TE).

However, the increased ductility of the composition of Example C5 is accompanied by an increase in melt viscosity or reduced flow properties. The addition of the polyetherester flow improver (Hytrel 4056) to the composition of Example E5 reduces the melt viscosity below that of Example C5 while maintaining the notched Izod ductility and increasing the Dynatup ductility.

All test methods mentioned above are hereby incorporated by reference.

Many variations of the present invention will suggest themselves to those skilled in this art in light of the above, detailed description. All such obvious variations are within the full intended scope of the appended claims.

I claim:

1. A reinforced, molding composition having improved ductility and melt flow properties comprising a uniform mixture of:
   (a) a cycloaliphatic polyester resin comprising the reaction product of an aliphatic $C_2$–$C_{12}$ diol or chemical equivalent and a $C_6$–$C_{12}$ aliphatic diacid or chemical equivalent, said cycloaliphatic polyester resin containing at least about 80% by weight of a cycloaliphatic dicarboxylic acid, or chemical equivalent, and/or of a cycloaliphatic diol or chemical equivalent;
   (b) 5% to about 25% by weight of an impact modifying amorphous resin which increases the ductility of the polyester resin (a) but reduces the melt flow properties thereof;
   (c) 2% to about 50% by weight of a high molecular weight polyetherester polymer which increases the melt flow properties of the impact-modified polyester polymer (a & b) without reducing the ductility thereof, and
   (d) 5% to about 50% by weight of a glass fiber filler to reinforce and stiffen the composition and form a reinforced molding composition.

2. A composition according to claim 1 in which the cycloaliphatic polyester resin comprises the reaction product of a $C_6$–$C_{12}$ cycloaliphatic diol or chemical equivalent and a $C_6$–$C_{12}$ cycloaliphatic diacid or chemical equivalent.

3. A composition according to claim 2 comprising:
   (a) from 20–80% by weight of the cycloaliphatic polyester resin;
   (c) from 5 to 35% by weight of the polyetherester polymer, and
   (d) from 10 to 40% by weight of the glass fiber filler.

4. A composition according to claim 1 in which the impact modifying amorphous resin is selected from the group consisting of graft or core-shell acrylic rubbers, diene rubber polymers and silicone rubber polymers.

5. A composition according to claim 3 in which the impact modifying amorphous resin comprises an acrylic core-shell polymer.

6. A composition according to claim 3 in which the impact modifying amorphous resin comprises a graft acrylic rubber.

7. A composition according to claim 1 in which the polyetherester polymer comprises a polytetrahydrofuran polymer.

8. A composition according to claim 7 in which the polyetherester polymer comprises a block copolymer of a polyester polymer and said polytetrahydrofuran polymer.

9. A composition according to claim 7 in which the polyetherester polymer comprises a polybutylene terephthalate-polyterahydrofuran copolymer.

10. A composition according to claim 7 in which the polyetherester polymer comprises a cycloaliphatic polyester-polytetrahydrofuran copolymer, where the cycloaliphatic polyester comprises the reaction product of a $C_6$–$C_{12}$ cyclic diol, or chemical equivalent, and a $C_6$–$C_{12}$ cyclic diacid, or chemical equivalent.

11. A composition according to claim 1 in which said mixture further comprises a polycarbonate polymer.

* * * * *